(No Model.) 2 Sheets—Sheet 1.
J. M. DEAL.
CLOSED CONDUIT ELECTRIC RAILWAY.
No. 546,130. Patented Sept. 10, 1895.
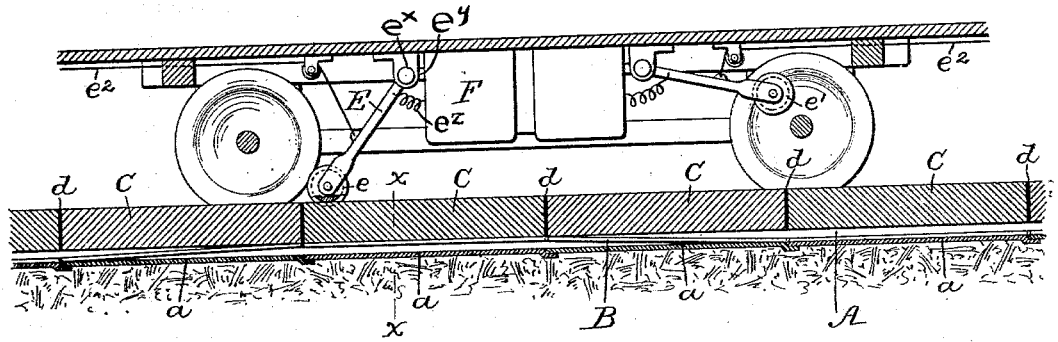
Fig. 1.
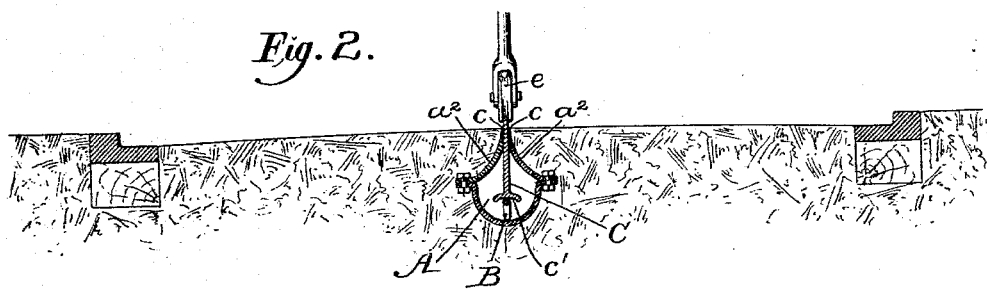
Fig. 2.
Fig. 3.
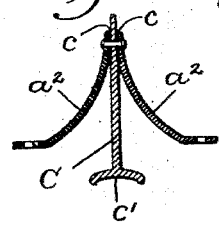
Fig. 5.
Fig. 4.
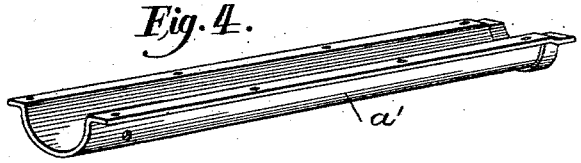
Fig. 6.
Witnesses.  
A. W. Groupe  
A. C. Somers
Inventor.  
John M. Deal,  
per John F. Nolan  
Attorney.

(No Model.) 2 Sheets—Sheet 2.

J. M. DEAL.
CLOSED CONDUIT ELECTRIC RAILWAY.

No. 546,130. Patented Sept. 10, 1895.

Witnesses.

Inventor.
John M. Deal,
per John F. Nolan,
Attorney.

UNITED STATES PATENT OFFICE.

JOHN M. DEAL, OF FERNWOOD, ASSIGNOR, BY DIRECT AND MESNE ASSIGNMENTS, TO HIMSELF, AND SAMUEL WADWORTH, OF CLIFTON, AND WILLIAM BARTRAM, OF LANSDOWNE, PENNSYLVANIA.

CLOSED-CONDUIT ELECTRIC RAILWAY.

SPECIFICATION forming part of Letters Patent No. 546,130, dated September 10, 1895.

Application filed November 26, 1894. Serial No. 529,917. (No model.)

*To all whom it may concern:*

Be it known that I, JOHN M. DEAL, a citizen of the United States, residing at Fernwood, in the county of Delaware and State of Pennsylvania, have invented certain new and useful Improvements in Electric Railways, of which the following is a full, clear, and exact description, reference being had to the accompanying drawings, forming a part of this specification.

The object of this invention is to provide an electric-railway system wherein the main conductor shall be confined in an inclosed underground conduit of such construction that the electric communication of the conductor with the motor on the traveling car shall be effected by induction between the charged conductor and a contact traversing the closed exterior of the conduit, to the end that the leakage and short-circuiting heretofore incident to underground conductors shall be minimized.

Figure 7:
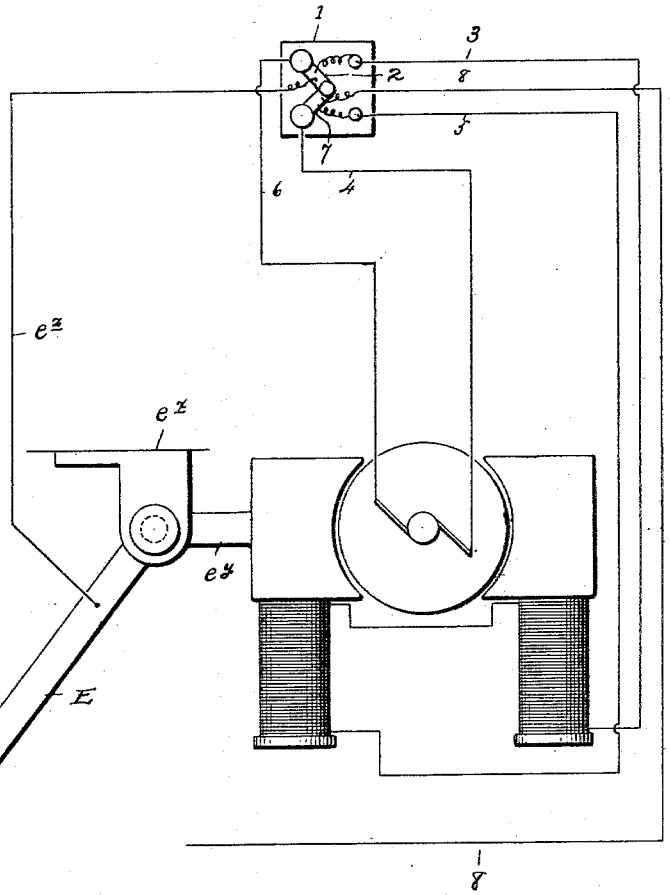
Figure 7:
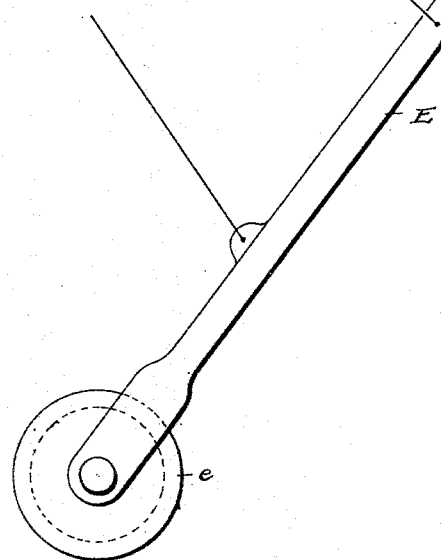

Referring to the drawings, Figure 1 is a vertical longitudinal section through the road-bed of my improved electric railway, showing so much of a car thereon as is necessary to illustrate my invention. Fig. 2 is a transverse section, enlarged, through the road-bed, as on line $x$ $x$, Fig. 1. Fig. 3 is a perspective view of the upper part of one of the conduit-sections. Fig. 4 is a similar view of the bottom or lower part thereof. Fig. 5 is a cross-section of Fig. 3, enlarged. Fig. 6 is a view of a portion of the jointed conductor. Fig. 7 is a diagram showing the connection of the depending arm to the pole-piece of the motor and also the electric connections of the motor.

Embedded in the roadway, midway of the track-rails, is a longitudinal conduit A, through which extends the main electric conductor B, which is energized in the usual manner. The conduit comprises a series of sections $a$, fitted end to end, each section comprising a trough $a'$ of insulating material—such, for example, as terra-cotta—having secured to its upper flanged edges, respectively, side plates $a^2$, which rise to the surface of the road-bed, or substantially so. The upper edges of these plates converge, as seen, so as to afford a cover for the trough. Between these converging edges is secured a longitudinally-disposed bar C of conducting material, strips $c$ of suitable insulating substance being interposed between the bar and the side plates, respectively. The upper edge of the longitudinal bar preferably projects slightly above the road-bed, as seen, and its lower edge extends down into the trough, so as to lie normally some distance above the conductor. The inner edge of the bar is preferably expanded, as at $c'$, so as to present a comparatively broad bearing-surface. The meeting ends of the troughs of the successive sections are overlapped, while the like ends of the plates $a^2$ and the bars C of such sections are separated by interposed pieces $d$ of insulating substance.

Pivoted to a bracket $e^x$ on the under side of the car is a depending arm E, of steel preferably, on the lower end of which is a trolley-wheel $e$, of steel or other good conductor. The arm is magnetically connected with one of the field-plates of the usual motor $f$ by means of a bar $e^y$, and it, said arm, is electrically connected with one of the brushes of the motor by means of a wire $e^z$. Hence when the field-plate is energized the arm E and its wheel, being magnetized, become a permanent magnet. The wheel is arranged and constructed to be brought into contact with the projecting edge of the bar C, to the end that the conductor shall be attracted into electrical contact with the lower or opposed edge of the bar, so that the current shall be transmitted from the conductor to the trolley-wheel and thence to the motor to effect the propulsion of the car. The depending arm and its wheel being in effect a part of the field-magnet, the magnetic force of said arm and wheel is governed directly by that of the field-magnet, being increased proportionately to the current transmitted to the motor.

Fig. 7 of the drawings illustrates more clearly the manner in which the depending arm E is connected with the pole-piece of one of the field-magnets, also a system of wiring which may be employed for the motor, together with a controller 1, by means of which the current can be reversed through the armature of the motor. With the switch in the position shown in this figure the current enters the movable switch-arm 2, where it divides, part passing by the wire 3 to the fields and part over wire 6 to the armature, returning, respectively, to the second switch-arm 7, which is independent of the arm 2, by means of wires 5 and 4, and thence to the return wire 8. By reversing the positions of the two arms 2 and 7, so that each makes contact with the terminal post or plate which was previously in contact with the other arm, the current is reversed through the armature. Any suitable system of wiring may, however, be employed.

The conductor is so constructed that it is brought into contact with that section only of the bar which is engaged by the trolley-wheel, in order that a direct transmission of the current from the conductor to the trolley-wheel shall be insured. Said wheel traverses the bar-sections successively, and in consequence the conductor is progressively raised into contact with the respective sections.

In order to insure the proper elevation of the conductor, it is made in parts corresponding in length with the bar sections, the ends of such parts being jointed together, so as to preserve the continuity of the conductor, as illustrated most clearly in Fig. 6.

The car is preferably provided with a second trolley-wheel $e'$, which is brought into action with the bar during the travel of the car in an opposite direction, the first described wheel in that case being thrown out of operation. The trolley-arms are operated by means of rope $e^2$ or other suitable connections.

I claim—

1. The combination, with a car, and an electric motor thereon, of a magnetic trolley arm directly connected with the pole-piece of the motor, and electrical connections between said arm and the motor, substantially as described.

2. In an electric railway, a conduit, comprising a trough, two converging side plates thereon, and a longitudinally disposed bar of conducting metal fastened to and between the converging edges of said plates, substantially as described.

3. The combination, with a car and an electric motor thereon, of a depending magnetic arm magnetically and electrically connected with the motor, and means for raising and lowering said arm, substantially as described.

In testimony whereof I have hereunto affixed my signature in the presence of two subscribing witnesses.

JOHN M. DEAL.

Witnesses:
JOHN R. NOLAN,
A. V. GROUPE.